(12) United States Patent
Gupta

(10) Patent No.: US 9,743,268 B2
(45) Date of Patent: Aug. 22, 2017

(54) CONTROL OF WLAN SELECTION POLICIES IN ROAMING SCENARIOS

(71) Applicant: Intel IP Corporation, Santa Clara, CA (US)

(72) Inventor: Vivek G. Gupta, San Jose, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/776,069

(22) PCT Filed: Dec. 26, 2013

(86) PCT No.: PCT/US2013/077764
§ 371 (c)(1),
(2) Date: Sep. 14, 2015

(87) PCT Pub. No.: WO2014/158274
PCT Pub. Date: Oct. 2, 2014

(65) Prior Publication Data
US 2016/0021606 A1    Jan. 21, 2016

Related U.S. Application Data

(60) Provisional application No. 61/806,821, filed on Mar. 29, 2013.

(51) Int. Cl.
| | |
|---|---|
| *H04W 8/08* | (2009.01) |
| *H04W 36/00* | (2009.01) |
| *H04W 8/02* | (2009.01) |
| *H04W 48/18* | (2009.01) |
| *H04L 5/00* | (2006.01) |

(Continued)

(52) U.S. Cl.
CPC ............. *H04W 8/082* (2013.01); *H04B 1/56* (2013.01); *H04B 7/0417* (2013.01);
(Continued)

(58) Field of Classification Search
CPC . H04W 48/18; H04W 48/16; H04W 36/0005; H04W 36/22; H04W 8/082; H04L 5/0073
See application file for complete search history.

(56) References Cited

U.S. PATENT DOCUMENTS 9,345,046 B2   5/2016   Li et al.
9,647,818 B2   5/2017   Han
(Continued)

FOREIGN PATENT DOCUMENTS

| CN | 104995961 A | 10/2015 |
|---|---|---|
| CN | 105075370 A | 11/2015 |

(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.3.0, figure 5.3.3.1-1., [Online]. Retrieved from the Internet: <http://www.3gpp.org/DynaReport/36331.htm>, (Mar. 18, 2013), 108, 129.

(Continued)

*Primary Examiner* — Omer S Mian
(74) *Attorney, Agent, or Firm* — Schwegmann Lundberg & Woessner, P.A.

(57) ABSTRACT

The Access Network Discovery and Selection Function (ANDSF) is a function in LTE networks that an operator can use to control how UEs prioritize between different access technologies if non-3GPP access networks such as wireless local area networks (WLANs) are available and can also assist devices to discover available access networks. Schemes are described that introduce flexibility in the control of WLAN selection in roaming scenarios based on HPLMN preferences.

18 Claims, 3 Drawing Sheets

(51) Int. Cl.

| | | |
|---|---|---|
| *H04B 1/56* | (2006.01) | |
| *H04W 48/16* | (2009.01) | |
| *H04W 56/00* | (2009.01) | |
| *H04W 36/30* | (2009.01) | |
| *H04W 24/00* | (2009.01) | |
| *H04W 36/26* | (2009.01) | |
| *H04B 7/0417* | (2017.01) | |
| *H04W 36/22* | (2009.01) | |
| *H04L 1/18* | (2006.01) | |
| *H04W 24/02* | (2009.01) | |
| *H04W 72/04* | (2009.01) | |
| *H04W 72/08* | (2009.01) | |
| *H04W 28/20* | (2009.01) | |
| *H04L 29/06* | (2006.01) | |
| *H04M 1/725* | (2006.01) | |
| *H04W 4/02* | (2009.01) | |
| *H04W 8/06* | (2009.01) | |
| *H04W 28/02* | (2009.01) | |
| *H04W 76/02* | (2009.01) | |
| *H04W 48/06* | (2009.01) | |
| *H04L 25/03* | (2006.01) | |
| *H04N 21/24* | (2011.01) | |
| *H04N 21/845* | (2011.01) | |
| *H04N 21/8543* | (2011.01) | |
| *H04B 7/0452* | (2017.01) | |
| *H04B 7/06* | (2006.01) | |
| *H04B 7/08* | (2006.01) | |
| *H04L 25/02* | (2006.01) | |
| *H04W 36/08* | (2009.01) | |
| *H04W 48/12* | (2009.01) | |
| *H04W 88/08* | (2009.01) | |
| *H04W 84/04* | (2009.01) | |
| *H04W 88/10* | (2009.01) | |
| *H04W 84/12* | (2009.01) | |
| *H04W 88/02* | (2009.01) | |
| *H04W 28/08* | (2009.01) | |

(52) U.S. Cl.
CPC ........... *H04B 7/0452* (2013.01); *H04B 7/063* (2013.01); *H04B 7/0695* (2013.01); *H04B 7/088* (2013.01); *H04L 1/1864* (2013.01); *H04L 5/0048* (2013.01); *H04L 5/0051* (2013.01); *H04L 5/0057* (2013.01); *H04L 5/0085* (2013.01); *H04L 25/0206* (2013.01); *H04L 25/03305* (2013.01); *H04L 65/4092* (2013.01); *H04L 65/601* (2013.01); *H04L 65/602* (2013.01); *H04L 65/604* (2013.01); *H04L 65/607* (2013.01); *H04L 65/608* (2013.01); *H04L 65/80* (2013.01); *H04M 1/72572* (2013.01); *H04N 21/2402* (2013.01); *H04N 21/8456* (2013.01); *H04N 21/8543* (2013.01); *H04W 4/021* (2013.01); *H04W 8/02* (2013.01); *H04W 8/06* (2013.01); *H04W 24/00* (2013.01); *H04W 24/02* (2013.01); *H04W 28/0226* (2013.01); *H04W 28/0289* (2013.01); *H04W 28/20* (2013.01); *H04W 36/0005* (2013.01); *H04W 36/0011* (2013.01); *H04W 36/0022* (2013.01); *H04W 36/22* (2013.01); *H04W 36/26* (2013.01); *H04W 36/30* (2013.01); *H04W 48/06* (2013.01); *H04W 48/16* (2013.01); *H04W 48/18* (2013.01); *H04W 56/001* (2013.01); *H04W 72/0446* (2013.01); *H04W 72/082* (2013.01); *H04W 76/025* (2013.01); *H04L 5/0007* (2013.01); *H04L 2025/03426* (2013.01); *H04W 28/085* (2013.01); *H04W 36/08* (2013.01); *H04W 48/12* (2013.01); *H04W 72/046* (2013.01); *H04W 84/042* (2013.01); *H04W 84/045* (2013.01); *H04W 84/12* (2013.01); *H04W 88/02* (2013.01); *H04W 88/08* (2013.01); *H04W 88/10* (2013.01); *Y02B 60/50* (2013.01)

(56) References Cited

U.S. PATENT DOCUMENTS

| | | |
|---|---|---|
| 2006/0268675 A1 | 11/2006 | Cho et al. |
| 2008/0186893 A1 | 8/2008 | Kolding et al. |
| 2009/0005057 A1 | 1/2009 | Lee et al. |
| 2009/0040955 A1 | 2/2009 | Jung et al. |
| 2009/0116573 A1 | 5/2009 | Gaal et al. |
| 2009/0290555 A1 | 11/2009 | Alpert et al. |
| 2010/0130237 A1 | 5/2010 | Kitazoe et al. |
| 2010/0208698 A1 | 8/2010 | Lu et al. |
| 2010/0267407 A1 | 10/2010 | Liao et al. |
| 2010/0310004 A1 | 12/2010 | Li et al. |
| 2011/0128865 A1 | 6/2011 | Doppler et al. |
| 2011/0188376 A1 | 8/2011 | Stupar et al. |
| 2012/0106475 A1 | 5/2012 | Jung |
| 2012/0209952 A1 | 8/2012 | Lotfallah et al. |
| 2012/0264412 A1 | 10/2012 | Tervonen et al. |
| 2012/0275365 A1 | 11/2012 | Anderson et al. |
| 2013/0005332 A1 | 1/2013 | Sedlacek et al. |
| 2013/0012182 A1 | 1/2013 | Liao |
| 2013/0301501 A1 | 11/2013 | Olvera-Hernandez et al. |
| 2014/0031028 A1 | 1/2014 | Yamada et al. |
| 2014/0086226 A1* | 3/2014 | Zhao .................. H04W 76/022 370/338 |
| 2014/0161007 A1 | 6/2014 | Donthi et al. |
| 2014/0185550 A1 | 7/2014 | Han et al. |
| 2014/0192651 A1* | 7/2014 | Sun .......... H04L 45/38 370/235 |
| 2014/0200000 A1* | 7/2014 | Jin .......... H04W 48/18 455/435.2 |
| 2014/0241333 A1* | 8/2014 | Kim ........ H04W 48/16 370/338 |
| 2014/0295858 A1 | 10/2014 | Li et al. |
| 2016/0050246 A1 | 2/2016 | Liao et al. |

FOREIGN PATENT DOCUMENTS

| | | |
|---|---|---|
| CN | 105103634 A | 11/2015 |
| CN | 106060912 A | 10/2016 |
| EP | 2979414 A | 2/2016 |
| JP | 20104587 A | 2/2010 |
| TW | 201445991 A | 12/2014 |
| TW | 201446039 A | 12/2014 |
| TW | I526062 B | 3/2016 |
| TW | I528851 B | 4/2016 |
| TW | 201640944 A | 11/2016 |
| WO | WO 2009127238 A1 | 10/2009 |
| WO | WO-2011050835 A1 | 5/2011 |
| WO | WO-2012090401 A1 | 7/2012 |
| WO | WO-2012110093 A1 | 8/2012 |
| WO | WO-2012111993 A2 | 8/2012 |
| WO | WO-2012134530 A1 | 10/2012 |
| WO | WO-2012138091 A2 | 10/2012 |
| WO | WO-2012167106 A1 | 12/2012 |
| WO | WO-2013017006 A1 | 2/2013 |
| WO | WO-2013022220 A1 | 2/2013 |
| WO | WO-2013042330 A1 | 3/2013 |
| WO | WO-2014158235 A1 | 10/2014 |
| WO | WO-2014158264 A1 | 10/2014 |
| WO | WO-2014158268 A1 | 10/2014 |
| WO | WO-2014158274 A1 | 10/2014 |

OTHER PUBLICATIONS

"U.S. Appl. No. 14/124,217, Non Final Office Action mailed Jun. 30, 2015", 9 pgs.

(56) References Cited

OTHER PUBLICATIONS

"U.S. Appl. No. 14/124,217, Preliminary Amendment filed Dec. 5, 2013", 3 pgs.
"U.S. Appl. No. 14/124,217, Response filed Aug. 21, 2015 to Non Final Office Action mailed Jun. 30, 2015", 12 pgs.
"Discussion and Recommendation for D2D channel modelling", NEC Group, R1-130376, 3GPP TSG RAN WG1 Meeting #72, (2013), 1-8.
"International Application Serial No. PCT/US2013/068766, International Search Report mailed Feb. 21, 2014", 3 pgs.
"International Application Serial No. PCT/US2013/068766, Written Opinion mailed Feb. 21, 2014", 5 pgs.
"International Application Serial No. PCT/US2013/077142, International Search Report mailed Apr. 25, 2014", 4 pgs.
"International Application Serial No. PCT/US2013/077142, Written Opinion mailed Apr. 25, 2014", 5 pgs.
"International Application Serial No. PCT/US2013/077255, International Search Report mailed Apr. 21, 2014", 3 pgs.
"International Application Serial No. PCT/US2013/077255, Written Opinion mailed Apr. 21, 2014", 6 pgs.
"International Application Serial No. PCT/US2013/077764, International Search Report mailed Apr. 24, 2014", 3 pgs.
"International Application Serial No. PCT/US2013/077764, Written Opinion mailed Apr. 24, 2014", 4 pgs.
"Taiwanese Application Serial No. 103111024, Office Action mailed Jul. 23, 2015", 11 pgs.
Alcatel-Lucent, et al., "LTE device to device evaluation methodology", R1-120469, 3GPP TSG-RAN1 Meeting #72, (2013), 1-7.
Miller, K., et al., "Adaptation algorithm for adaptive streaming over HTTP", 2012 19th International Packet Video Workshop (PV), (2012), 173-178.
New Postcom, "Evaluation scenarios and channel models for D2D communications", R1-130154, 3GPP TSG-RAN1 Meeting #72, (2013), 1-5.
Nokia, et al., "On LTE D2D Methodologies and Metrics", R1-130501, 3GPP TSG RAN WG1 Meeting #72, (2013), 1-4.
U.S. Appl. No. 14/778,705, filed Sep. 21, 2015, Quality-Aware Rate Adaptation Techniques for Dash Streaming.
U.S. Appl. No. 14/779,024, filed Sep. 22, 2015, Extended Paging Discontinuous Reception (DRX) Cycles in Wireless Communication Networks.
U.S. Appl. No. 14/124,217, filed Dec. 5, 2013, User Equipment and Method for Distributed Channel Access for D2D Communications.
U.S. Appl. No. 14/142,021, filed Dec. 27, 2013, An Apparatus and Method for Single-Tone Device Discovery in Wireless Communication Networks.
"U.S. Appl. No. 14/124,217, Notice of Allowance mailed Jan. 14, 2016", 8 pgs.
"U.S. Appl. No. 14/124,217, Response filed Dec. 17, 2015 to Final Office Action mailed Sep. 17, 2015", 13 pgs.
"U.S. Appl. No. 14/142,021, Response filed Feb. 17, 2016 to Non Final Office Action mailed Sep. 18, 2015", 9 pgs.
"3rd Generation Partnership Project; Technical Specification Group Core Network and Terminals; Mobile radio interface Layer 3 specification; Core network protocols; Stage 3 (Release12)", 3GPP Standard; 3GPP TS 2 4 .0 0 8 , 3rd Generation Partnership Project (3GPP), Mobile Competence Centre ; 650, Route Deslucioles ; F-06921 Sophia-Antipolis Cedex; France (Dec. 19, 2012), 252 pgs.
"3rd Generation Partnership Project; Technical Specification Group Services and System Aspects; Machine-Type and other Mobile Data Applications Communications Enhancements (Release 12)", 3GPP TR 23.887 V0.8.0, 3rd Generation Partnership Project (3GPP), Mobile Competence Centre; 650, Route Des Lucioles; F-06921 Sophia-Antipolis Cedex; France, (Feb. 12, 2013), 107 pgs.
"3rd Generation Partnership Project; Technical Specification Group Services and System Aspects; Machine-Type and other Mobile Data Applications Communications Enhancements (Release12)", 3GPP Standard; 3GPP TR 2 3 .8 8 7 , 3rd Generation Partnership Project (3GPP), Mobile Competence Centre ; 650, Route Des Lucioles ; F-06921 Sophia-Antipolis Cedex; France, (Dec. 18, 2012), 90 pgs.

"3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH) (Release 11)", 3GPP Standard; 3GPP TS 26.247, 3rd Generation Partnership Project (3GPP), Mobile Competence Centre ; 650, Route Des Lucioles ; F-06921 Sophia-Antipolis Cedex ; France, vol. SAWG4, No. V 11.1.0, XP050691164, (Dec. 5, 2012), 1-113.
"U.S. Appl. No. 14/142,021, Advisory Action mailed Oct. 26, 2016", 4 pgs.
"U.S. Appl. No. 14/142,021, Final Office Action mailed Apr. 29, 2016", 19 pgs.
"U.S. Appl. No. 14/142,021, Notice of Allowance mailed Dec. 23, 2016", 16 pgs.
"U.S. Appl. No. 14/142,021, Response filed Sep. 29, 2016 to Final Office Action mailed Apr. 29, 2016", 8 pgs.
"U.S. Appl. No. 14/779,024, Non Final Office Action mailed Dec. 23, 2016", 13 pgs.
"European Application Serial No. 13880537.9, Extended European Search Report mailed Oct. 31, 2016", 8 pgs.
"European Application Serial No. 13880622.9, Extended European Search Report mailed Nov. 7, 2016", 11 pgs.
"European Application Serial No. 13880623.7, Extended European Search Report mailed Oct. 31, 2016", 8 pgs.
"Extending idle mode DRX cycle by using NAS procedures", Samsung:3GPP Draft; S2-124264 UEPCOP S0luti0n__R2, 3rd Generation Partnership Project (3GPP),Mobile Competence Centre ; 650, Route Des Lucioles ; F-06921 Sophia-Antipolis Cedex; France, (Nov. 6, 2012), 4 pgs.
"Introduction of longer SFN length for MTC", Samsung: 3GPP Draft; R2-100331, 3rd Generation Partnership Project (3GPP), Mobile Competence Centre ; 650, Route Deslucioles ; F-06921 Sophia-Antipolis Cedex; France, (Jan. 12, 2010), 2 pgs.
"Taiwanese Application Serial No. 103111080, Response filed Apr. 27, 2016 to Office Action mailed Oct. 28, 2015", (English Translation of Claims), 68 pgs.
"Taiwanese Application Serial No. 105103027, Office Action mailed Dec. 6, 2016", W/ English Translation, 28 pgs.
Huysegems, Raf, et al., "Session reconstruction for HTTP adaptive Streaming: Laying the foundation for network-based QoE monitoring", Quality of Service (IWQOS), IEEE 20th International Workshop on, IEEE, XP032207367, DOI: 10.1109/IWQOS.2012. 6245987 ISBN: 978-1-4673-1296-7, (Jun. 4, 2012), 1-9.
"U.S. Appl. No. 14/124,217, Final Office Action mailed Sep. 17, 2015", 10 pgs.
"U.S. Appl. No. 14/142,021, Non Final Office Action mailed Sep. 18, 2015 ", 18 pgs.
"Application Serial No. PCT/US2013/068766, International Preliminary Report on Patentability mailed Oct. 8, 2015", 7 pgs.
"Application Serial No. PCT/US2013/077142, International Preliminary Report on Patentability mailed Oct. 8, 2015", 7 pgs.
"Application Serial No. PCT/US2013/077764, International Preliminary Report on Patentability mailed Oct. 8, 2015", 6 pgs.
"International Application Serial No. PCT/US2013/077255, International Preliminary Report on Patentability mailed Oct. 8, 2015", 8 pgs.
"Taiwanese Application Serial No. 103111024, Response filed Nov. 11, 2015 to Office Action mailed Jul. 23, 2015", w/ English Claims, 19 pgs.
"Taiwanese Application Serial No. 103111080, Office Action mailed Oct. 28, 2015", w/ English Translation of Search Report, 10 pgs.
"WLAN Network Selection Based on ANDSF", 3GPP SA WG2 Meeting S2-130165, Qualcomm Incorporated, AT&T, (Jan.-Feb. 1, 2013).
Huawei, Hisilicon, "Solutions for Interaction between WLAN network selection and network-provided policies for WLAN selection", 3GPP SA WG2 Meeting S2-130125, Broadcom Corporation, (Jan.-Feb. 1, 2013).
"European Application Serial No. 13880537.9, Response Filed May 26, 2017 to Extended European Search Report dated Oct. 31, 2016", 21 pgs.

(56) References Cited

OTHER PUBLICATIONS

"European Application Serial No. 13880622.9, Response Filed May 19, 2017 to Extended European Search Report dated Nov. 7, 2016", (W/ Claims), 8 pgs.

"European Application Serial No. 13880623.7, Response Filed May 26, 2017 to Extended European Search Report dated Oct. 31, 2016", 11 pgs.

"U.S. Appl. No. 14/779,024, Notice of Allowance dated Jun. 12, 2017", 6 pgs.

"U.S. Appl. No. 14/779,024, Response filed Apr. 24, 2017 to Non Final Office Action dated Dec. 23, 2016", 7 pgs.

* cited by examiner

CONTROL OF WLAN SELECTION POLICIES IN ROAMING SCENARIOS

PRIORITY CLAIM

This application is a U.S. National Stage Application under 35 U.S.C. 371 from International Application No. PCT/US2013/077764, filed Dec. 26, 2013, which claims priority to U.S. Provisional Patent Application Ser. No. 61/806,821, filed Mar. 29, 2013, all of which are incorporated herein by reference in their entirety.

TECHNICAL FIELD

Embodiments described herein relate generally to wireless networks and communications systems.

BACKGROUND

In LTE (Long Term Evolution) cellular systems, as set forth in the LTE specifications of the 3rd Generation Partnership Project (3GPP), a terminal (where a terminal is referred to in LTE systems as user equipment or UE) acquires cellular network access by connecting to a public land mobile network (PLMN) belonging to an operator or service provider. The connectivity to the PLMN is provided by a base station (referred in LTE systems as an evolved Node B or eNB). In addition to such cellular network access, so-called dual-mode UEs also incorporate functionality for simultaneously acquiring network access via a wireless local area network (WLAN), typically WiFi. In a roaming situation, where the UE acquires cellular network access from an operator other than its home operator, the dual-mode UE has choices in routing IP (internet protocol) flows through either the cellular network or one or more WLANs. The home operator (referred to as the home PLMN or HPLMN) may have preferences in this regard as may the visited operator (referred to as the visited PLMN or VPLMN).

The current 3GPP specifications describe the order and priority between HPLMN and VPLMN preferences in different roaming scenarios as being based on two fundamental architectural principles that should be fulfilled: (a) The HPLMN controls the serving PLMN selected by the UE, and (b) in case of conflicts the policies provided by the VPLMN take precedence over the ones provided by the HPLMN. The first principle gives the home operator priority in selecting cellular access, and the second principle is based on the assumption that the VPLMN should have the final say on WLAN network selection for inbound roamers since they are using the VPLMN resources.

DETAILED DESCRIPTION

Figure 1:
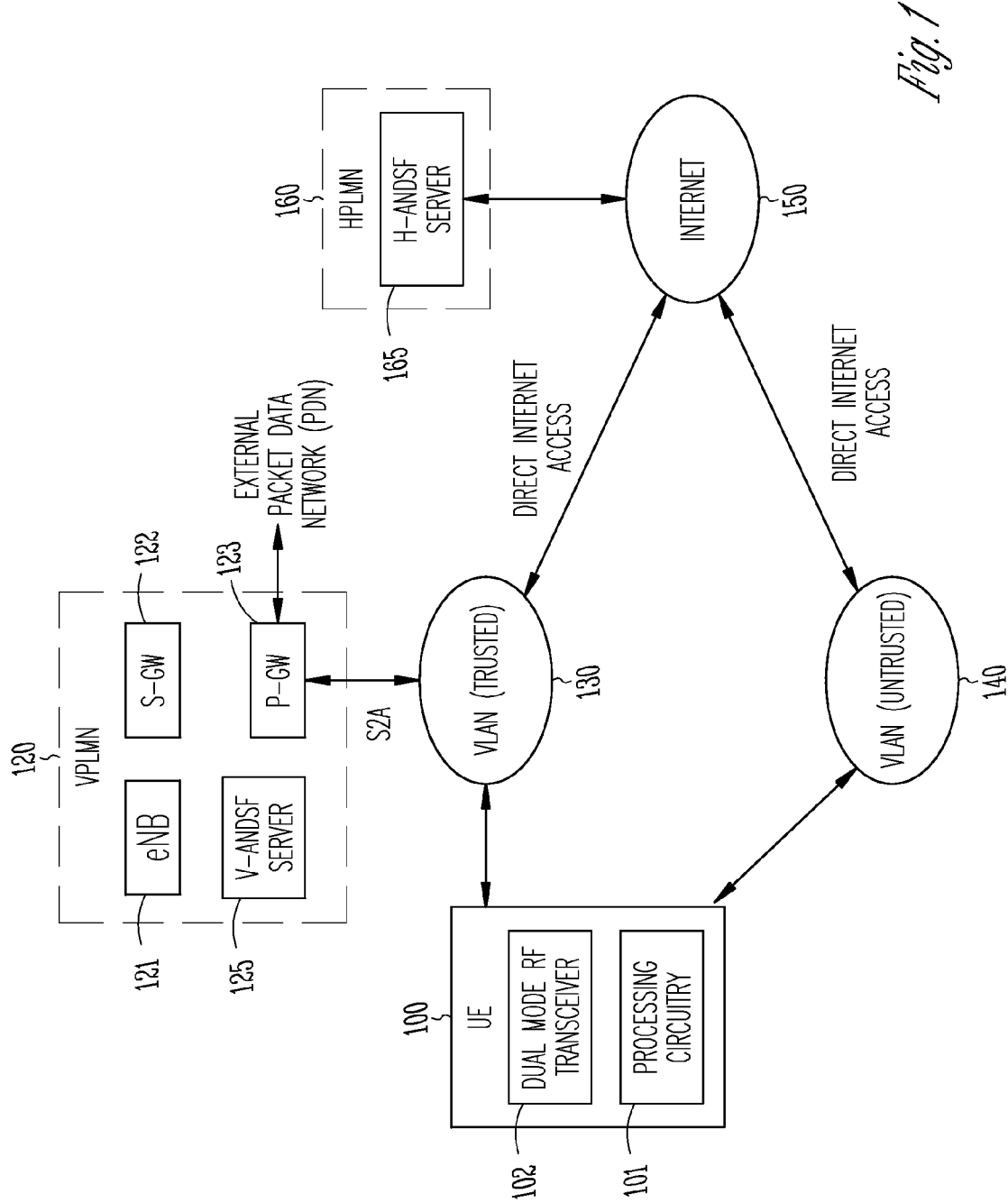
FIG. 1 illustrates an example roaming scenario where a UE acquires both cellular and WLAN network access.

The architectural principles discussed above were introduced in 3GPP when there was no Non-Seamless WLAN Offload (NSWO), there was no S2a based connectivity over WLAN (trusted WLAN access), and roaming relationships with WLAN service providers were largely not in place. As such there is a need to overhaul these rules and introduce more flexibility in control of WLAN selection in roaming scenarios based on HPLMN preferences. Note that simply making the UE prefer HPLMN rules would fulfill architectural principle (a), but not principle (b). On the other hand, if the UE prefers the VPLMN rules, the solution would fulfill architectural principle (b), but not principle (a).

The Access Network Discovery and Selection Function (ANDSF) is a function in LTE networks that an operator can use to control how UEs prioritize between different access technologies if several non-3GPP access networks are available and can also assist devices to discover available access networks. Described herein are solutions for establishing the precedence between the ANDSF of a VPLMN (referred to as a visited ANDSF or VANDSF) and that of a HPLMN (referred to as a home ANDSF or HANDSF) and for enabling the VPLMN to drive WLAN selection while the HPLMN remains in charge of PLMN selection. The described solutions enhance ANDSF and introduce flexibility in the applicability of HPLMN/VPLMN control based on the type of WLAN access and the possible use of resources in different scenarios which satisfies both the architectural constraints (a) and (b) above. The enhancements allow a service provider to control which operators are selected in roaming scenarios for WLAN and thus it can control the business in roaming cases for deployed WLAN networks.

Roaming implies that the dual-mode UE is roaming is using the cellular subscription provided by the 3GPP operator, but the UE may actually be non-roaming on its Wi-Fi access side based on other Wi-Fi subscriptions. The dual-mode UE is then using the VANDSF which is the ANDSF operated by the cellular VPLMN. The ANDSF or other policy servers belonging to Wi-Fi roaming partners are out of scope from 3GPP perspective. The ANDSF in these cases selects the Wi-Fi service provider as well. Justification for using VANDSF for Wi-Fi network selection/routing policies is found in scenarios where IP address preservation across Wi-Fi and cellular accesses is required. In these scenarios, the VANDSF can provide better guidance on Wi-Fi network selection and routing policies. Therefore, in one embodiment, the VANDSF is used for network selection and routing policies only when a dual-mode UE and VPLMN support SaMOG (S2a-based Mobility over GTP (general packet radio service tunneling protocol) or the UE settings (via home operator or user preference) indicate a preference for SaMOG or IP address preservation.

When non-seamless WLAN offloading (NSWO) is preferred by the HPLMN or the user, then no IP address preservation is provided across Wi-Fi and cellular accesses and traffic will be routed over Wi-Fi directly to the internet. In the case of NSWO, the user can be roaming on the cellular access but at home on the Wi-Fi or roaming on a different roaming partner on Wi-Fi than the cellular VPLMN. Therefore, in one embodiment, selection of Wi-Fi access network/service provider and routing policies in such cases is based on the HPLMN's ANDSF policies as the cellular VPLMN may misguide the UE to use that particular VPLMN's preferred Wi-Fi network when that may be different than HPLMN's preference.

System Description

FIG. 1 illustrates an example roaming scenario where a UE 100 has acquired cellular network access from a VPLMN 120 and may additionally acquire network access via one or more of WLANs 130 and 140. The UE 100 includes processing circuitry 101 and a dual-mode RF (radio-frequency) transceiver (or transceivers) for both WLAN and cellular network access. The UE 100 communicates with eNB 121 of the VPLMN 120 via an RF communications link, sometimes referred to as the LTE radio or air interface. The eNB 121 provides connectivity to the VPLMN's evolved packet core (EPC), the main components of which (in the user plane) are S-GW 122 (serving gateway) and P-GW 123 (packet data network (PDN) gateway). The P-GW is the EPC's point of contact with the outside world and exchanges data with one or more packet data networks such as the internet, while the S-GW acts as a router between the eNB and P-GW.

The UE 100 may also acquire network access through WLANs 130 and 140, each of which is able to provide connectivity to the internet 150 via direct internet access. When UE 100 has simultaneously acquired network access through VPLMN 120 and one or more of WLANs 130 and 140, it may offload IP traffic to either WLAN in a manner such that the offloaded IP traffic does not traverse the EPC of the VPLMN in a procedure known as non-seamless WLAN offload (NSOW). Offloading IP flows with NSOW does not provide IP address preservation for session continuity as the mobility anchor of the EPC is not maintained. WLAN 140 is shown as being an untrusted network and is only able to provide NSOW. WLAN 130, on the other hand, is shown as being a trusted network. As such, the VPLMN may provide direct connectivity between WLAN 130 and P-GW 123 via an S2a interface so that IP traffic from the WLAN is routed through the EPC of VPLMN 120. When UE 100 is simultaneously connected to the VPLMN 120 and WLAN 130, the S2a interface is thus able to provide WLAN offloading with IP address preservation for session continuity, sometimes referred to as SaMOG (S2a-based Mobility over GTP (general packet radio service tunneling protocol)). Traffic may also be routed through the S2a interface without IP address preservation.

As shown in FIG. 1, if the VPMLN 120 supports SaMOG and S2a access over EPC and the UE 100 prefers that type of access, the UE should select a WLAN based on the VPLMN's policies because only the VPLMN knows which WLANs are configured to support EPC access with S2a connectivity. This could be on a per WLAN AP (application protocol) basis or per SSID (service set identifier) basis. So in this situation, the HPLMN preferences should not apply for WLAN selection. If the UE prefers to perform NSWO, on the other hand, the selected WLAN is not required to support any specific interworking mechanisms with the VPLMN. In fact, any WLAN can be used for establishing connectivity, as long as it provides access to the internet. So the UE is then able to select a WLAN based on the HPLMN preferences and can override VPLMN preferences in this case. Whether or not the UE should override the VPLMN preferences can be controlled by the HPLMN.

The UE 100 acquires ANDSF information from a home ANDSF (H-ANDSF) server 165 belonging to the UE's home operator HPLMN 160 and a visited ANDSF (V-ANDSF) server 125 operated by the VPLMN 120. ANDSF information communicated to the UE provides an operator with a tool for steering the UE to preferentially use particular networks for access. The ANDSF information provided to the UE by an ANDSF server may include the following: access network discovery and selection information, inter-system mobility policies (ISMPs), and inter-system routing policies (ISRPs). The access network discovery and selection information includes a list of access networks available in the vicinity of the UE, including 3GPP networks and other types such as WLAN. The information may include the access technology types as well as validity conditions (e.g., where and when the information is valid). ISMPs are a set of operator-defined rules and preferences that affect the inter-system mobility decisions taken by the UE, including decisions about whether to use 3GPP or non-3GPP access, when the UE can use only a single radio access interface at one time. The ISRPs are a set of operator-defined rules and preferences that affect the routing decisions taken by the UE with respect to 3GPP or a particular type of non-3GPP access when the UE can route IP traffic simultaneously over multiple radio access interfaces. The ANDSF information is made up of parameter values organized into a data structure called an ANDSF management object (ANDSFMO). An ANDSFMO is a tree-structure having interior nodes and leaf nodes, where the leaf nodes contain the actual parameter values and the interior nodes act as placeholders for organizing the information.

In one embodiment, if the UE indicates a preference for IP address preservation (e.g., SaMOG), then V-ANDSF policies are to be preferred for WLAN network selection and routing policies. In another embodiment, if the UE indicates a preference for NSWO, then H-ANDSF policies should take precedence for WLAN network selection and routing policies. In another embodiment, the VPLMN indicates to the UE if it supports WLAN access using S2a. For example, this can be done with a new leaf in the ISRP. In another embodiment, if the UE prefers NSWO, and if the ISRP rule from the VPLMN includes a rule for NSWO, then the UE can select a WLAN based on the HPLMN preferences. In other cases, the UE may consider only the ISRP rule from the VPLMN, as currently specified. In another embodiment, for NSWO-related rules, the HPLMN can indicate in ANDSF information whether HPLMN rules should have precedence over VPLMN rules. For example, the indication may say to prefer HPLMN policies and disregard V-ANDSF NSWO rules or to give precedence to V-ANDSF NSWO rules. The home operator may also add in the ANDSFMO a list of preferred service providers which can take priority for the NSWO case.

Figure 2:
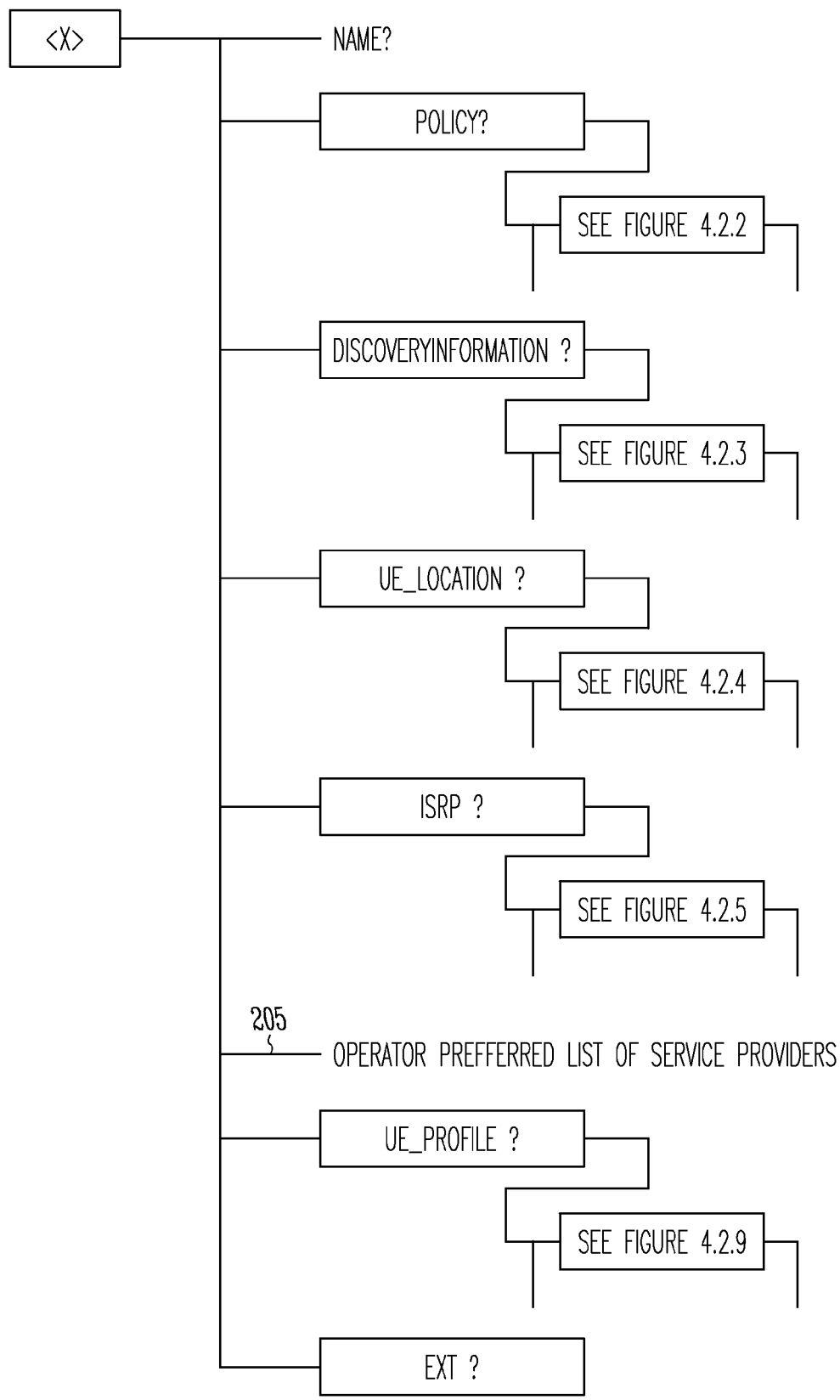
FIGS. 2 and 3 illustrate portions of an ANDSFO.
Figure 3:
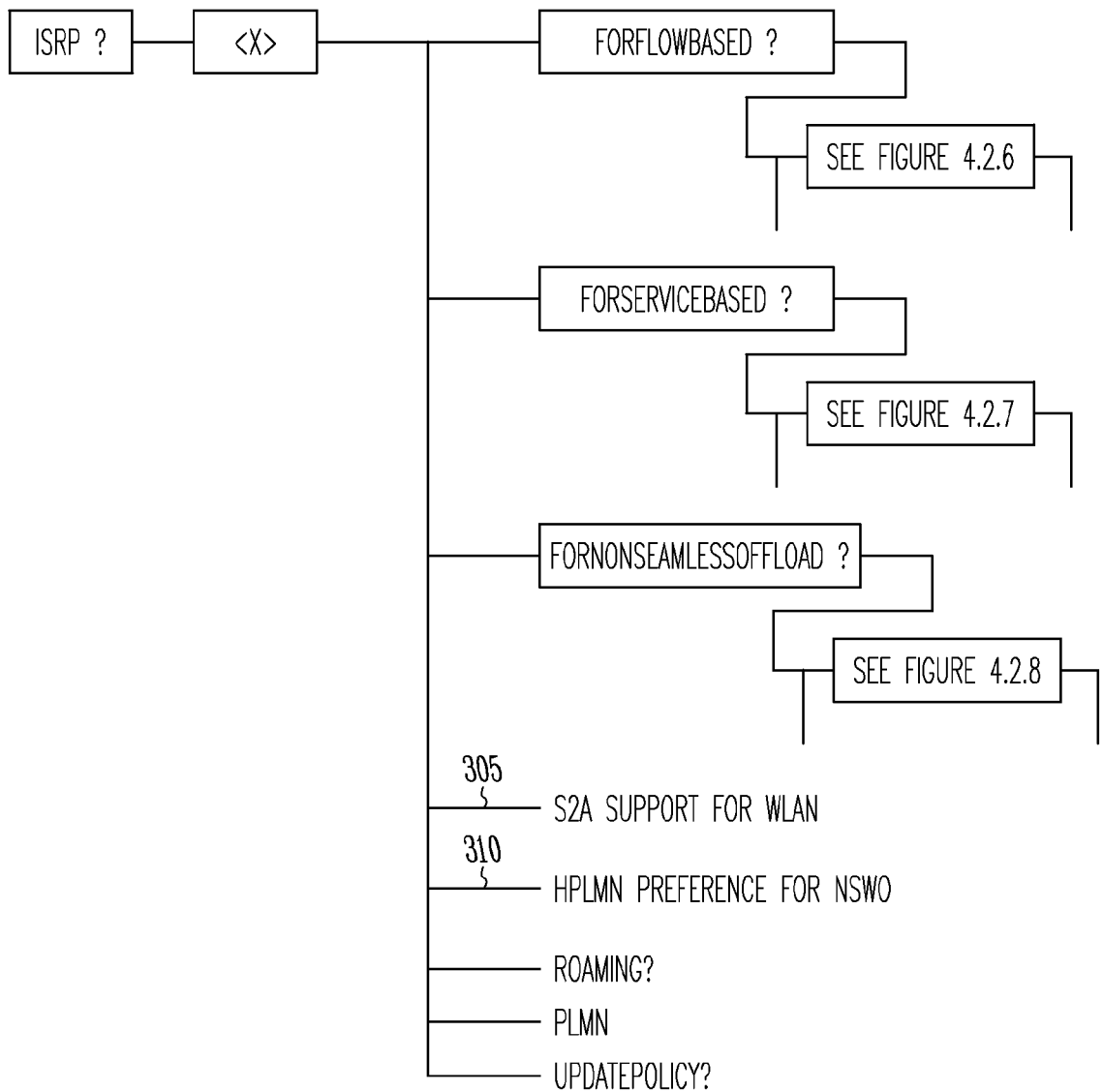

The structure of the ANDSFMO according to the LTE specifications is set forth in 3GPP TS 24.312. FIGS. 2 and 3 are reproductions of FIGS. 4.2.1 and 4.2.5, respectively, of 3GPP TS 24.312 to which have been added modifications as discussed above. FIG. 3 shows a portion of the ANDSFMO to which has been added leaves 305 and 310. Leaf 305 allows an ANDSF server to indicate whether or not its network provides support for access WLAN access using the S2a interface. Leaf 310 allows an H-ANDSF server to indicate whether the UE should or should not follow HPLMN policies for NSWO. FIG. 2 shows a portion of the ANDSFMO to which has been added leaf 205. Leaf 205 allows an HPLMN to make its list of preferred service providers known to the UE. That list may be used, for example, during NSWO while following HPLMN policies.

Additional Notes and Examples

In Example 1, a method for operating a user equipment (UE) in an LTE (Long Term Evolution) network comprises: when network access has been acquired from a visited cellular operator and can be acquired from one or more WLANs (wireless local area network), retrieving a setting that indicates a preference or not for IP (internet protocol) address preservation when switching between cellular and WLAN access; and, if no preference for IP address preservation is indicated, preferring policies for network selection and routing as indicated by ANDSF (access network and discovery selection function) information received from an H-ANDSF (home operator ANDSF) server over information received from a V-ANDSF (visited operator ANDSF) server.

In Example 2, the subject matter of Example 1 may optionally include: preferring policies for network selection and routing as indicated by ANDSF information received from the H-ANDSF only if information received from the H-ANDSF indicates to do so when no preference for IP preservation is indicated.

In Example 3, the subject matter of Example 1 may optionally include: storing ANDSF information received from the H-ANDSF server in an ANDSF MO (management object) that includes a leaf for the H-ANDSF server to indicate that its policies for network selection and routing should be preferred when no preference for IP preservation is indicated.

In Example 4, the subject matter of Example 1 may optionally include: if a preference for IP address preservation is indicated, preferring policies for network selection and routing as indicated by the V-ANDSF server over those as indicated by the H-ANDSF server only if the V-ANDSF server indicates that the visited operator has support for WLAN access using an S2a interface.

In Example 5, the subject matter of Example 1 may optionally include: storing ANDSF information received from the H-ANDSF and V-ANDSF servers in an ANDSF MO (management object) that includes a leaf for an ANDSF server to indicate whether or not support exists for WLAN access using an S2a interface.

In Example 6, the subject matter of Example 1 may optionally include selecting service providers for NSWO (non-seamless WLAN offload) in accordance with information received from the H-ANDSF.

In Example 7, the subject matter of Example 1 may optionally include: storing ANDSF information received from the H-ANDSF server in an ANDSF MO (management object) that includes a leaf for the H-ANDSF server to indicate a preferred list of service providers to use for NSWO.

In Example 8, a method for operating a user equipment (UE) in an LTE (Long Term Evolution) network comprises: when network access has been acquired from a visited cellular operator and can be acquired one or more WLANs (wireless local area network), retrieving a setting that indicates a preference or not for NSWO (non-seamless WLAN offload) with no IP (internet protocol) address preservation when switching between cellular and WLAN access; and, if a preference for NSWO is indicated, preferring policies for network selection and routing as indicated by ANDSF (access network and discovery selection function) information received from an H-ANDSF (home operator ANDSF) server over information received from a V-ANDSF (visited operator ANDSF) server.

In Example 9, the subject matter of Example 8 may optionally include wherein the setting for preferring policies for network selection and routing as indicated by ANDSF information received from the H-ANDSF for purposes of NSWO is received from the H-ANDSF server.

In Example 10, the subject matter of Example 8 may optionally include storing ANDSF information received from the H-ANDSF server in an ANDSF MO (management object) that includes a leaf for the H-ANDSF server to indicate that its policies for network selection and routing should be preferred when a preference for NSWO is indicated.

In Example 11, the subject matter of Example 8 may optionally include: if no preference NSWO is indicated, preferring policies for network selection and routing as indicated by the V-ANDSF server over those as indicated by the H-ANDSF server only if the V-ANDSF server indicates that the visited operator has support for WLAN access using an S2a interface.

In Example 12, the subject matter of Example 8 may optionally include: storing ANDSF information received from the H-ANDSF and V-ANDSF servers in an ANDSF MO (management object) that includes a leaf for an ANDSF server to indicate whether or not support exists for WLAN access using an S2a interface.

In Example 13, the subject matter of Example 8 may optionally include selecting service providers for NSWO in accordance with information received from the H-ANDSF.

In Example 14, the subject matter of Example 8 may optionally include: storing ANDSF information received from the H-ANDSF server in an ANDSF MO (management object) that includes a leaf for the H-ANDSF server to indicate a preferred list of service providers to use for NSWO (non-seamless WLAN offload).

In Example 15, a method for operating a user equipment (UE) in an LTE (Long Term Evolution) network comprises: when network access has been acquired from a visited cellular operator and can be acquired from one or more WLANs (wireless local area network), retrieving ANDSF (access network and discovery selection function) information received from a V-ANDSF (visited operator ANDSF) server indicating whether or not the visited cellular operator supports SaMOG (S2a-based Mobility over GTP (general packet radio service tunneling protocol); and, if the visited cellular operator does not support SaMOG, preferring policies for network selection and routing as indicated by ANDSF information received from an H-ANDSF (home operator ANDSF) server over information received from the V-ANDSF.

In Example 16, the subject matter of Example 15 may optionally include preferring policies for network selection and routing as indicated by ANDSF information received from the H-ANDSF only if information received from the H-ANDSF indicates to do so when the visited cellular operator does not support SaMOG.

In Example 17, the subject matter of Example 15 may optionally include: storing ANDSF information received from the H-ANDSF server in an ANDSF MO (management object) that includes a leaf for the H-ANDSF server to indicate that its policies for network selection and routing should be preferred when the visited cellular operator does not support SaMOG.

In Example 18, the subject matter of Example 15 may optionally include: storing ANDSF information received from the H-ANDSF and V-ANDSF servers in an ANDSF MO (management object) that includes a leaf for an ANDSF server to indicate whether or not support exists for WLAN access using an S2a interface.

In Example 19, the subject matter of Example 15 may optionally include selecting service providers for NSWO (non-seamless WLAN offload) in accordance with information received from the H-ANDSF.

In Example 20, the subject matter of Example 15 may optionally include: storing ANDSF information received from the H-ANDSF server in an ANDSF MO (management object) that includes a leaf for the H-ANDSF server to indicate a preferred list of service providers to use for NSWO.

In Example 21, a method for operating a UE comprises: retrieving a setting indicating whether the UE, for purposes of NSWO (non-seamless WLAN (wireless local area network) offload), is to prefer policies for network selection and routing as indicated by ANDSF (access network and discovery selection function) information received from an H-ANDSF (home operator ANDSF) server over information received from a V-ANDSF (visited operator ANDSF) server;

and, if H-ANDSF policies are to be preferred, selecting a WLAN for NSWO in accordance therewith.

In Example 22, the subject matter of Example 21 may optionally include any of the optional inclusions stated in Examples 9 through 14.

In Example 23, a computer-readable medium contains instruction for performing any of the methods of Examples 1 through 22.

In Example 24, a UE comprises processing circuitry and a radio-frequency transceiver for both cellular and WLAN (wireless local area network) access, wherein the processing circuitry is to perform any of the methods of Examples 1 through 22.

In Example 25, an ANDSF server comprises processing circuitry and a radio-frequency transceiver and/or network interface, wherein the processing circuitry is to transmit ANDSF information as an ANDSF MO that includes a leaf for the HPLMN to indicate a preferred list of service providers to use for NSWO, a leaf for the ANDSF server to indicate whether or not support exists for WLAN access using an S2a interface, and/or a leaf indicating that HPLMN policies for network selection and routing should be preferred when a visited cellular operator does not support SaMOG.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The embodiments as described above may be implemented in various hardware configurations that may include a processor for executing instructions that perform the techniques described. Such instructions may be contained in a machine-readable medium such as a suitable storage medium or a memory or other processor-executable medium.

The embodiments as described herein may be implemented in a number of environments such as part of a wireless local area network (WLAN), 3rd Generation Partnership Project (3GPP) Universal Terrestrial Radio Access Network (UTRAN), or Long-Term-Evolution (LTE) or a Long-Term-Evolution (LTE) communication system, although the scope of the invention is not limited in this respect. An example LTE system includes a number of mobile stations, defined by the LTE specification as User Equipment (UE), communicating with a base station, defined by the LTE specifications as an eNodeB.

Antennas referred to herein may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, antennas may be effectively separated to take advantage of spatial diversity and the different channel characteristics that may result between each of antennas and the antennas of a transmitting station. In some MIMO embodiments, antennas may be separated by up to $1/10$ of a wavelength or more.

In some embodiments, a receiver as described herein may be configured to receive signals in accordance with specific communication standards, such as the Institute of Electrical and Electronics Engineers (IEEE) standards including IEEE 802.11-2007 and/or 802.11(n) standards and/or proposed specifications for WLANs, although the scope of the invention is not limited in this respect as they may also be suitable to transmit and/or receive communications in accordance with other techniques and standards. In some embodiments, the receiver may be configured to receive signals in accordance with the IEEE 802.16-2004, the IEEE 802.16(e) and/or IEEE 802.16(m) standards for wireless metropolitan area networks (WMANs) including variations and evolutions thereof, although the scope of the invention is not limited in this respect as they may also be suitable to transmit and/or receive communications in accordance with other techniques and standards. In some embodiments, the receiver may be configured to receive signals in accordance with the Universal Terrestrial Radio Access Network (UTRAN) LTE communication standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," May 2005 and related amendments/versions. For more information with respect to UTRAN LTE standards, see the 3rd Generation Partnership Project (3GPP) standards for UTRAN-LTE, release 8, March 2008, including variations and evolutions thereof.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A user equipment (UE) device, comprising:
processing circuitry and a radio transceiver for both cellular and WLAN (wireless local area network) access, wherein the processing circuitry is configured to:
determine that network access has been acquired from a visited cellular operator and one or more WLANs (wireless local area network),
retrieve, in response to said determination, a setting that indicates a preference for IP (internet protocol) address preservation when switching between cellular and WLAN access;
if the preference indicates that IP address preservation is not to be performed, prefer policies for network selection and routing as indicated by ANDSF (access network and discovery selection function) information received from an H-ANDSF (home operator ANDSF) server over information received from a V-ANDSF (visited operator ANDSF) server; and
if the preference indicates that IP address preservation is to be performed, prefer policies for network selection and routing as indicated by the V-ANDSF server over those as indicated by the H-ANDSF server wherein the V-ANDSF server indicates that the visited cellular operator has support for WLAN access using an S2a interface.

2. The device of claim 1 wherein the processing circuitry is to prefer policies for network selection and routing as indicated by ANDSF information received from the H-ANDSF only if information received from the H-ANDSF indicates to do so when the preference indicates that IP address preservation is not to be performed.

3. The device of claim 1 wherein the processing circuitry is to:
store ANDSF information received from the H-ANDSF server in an ANDSF MO (management object) that includes a leaf for the H-ANDSF server to indicate that its policies for network selection and routing should be preferred when the preference indicates that IP address preservation is not to be performed.

4. The device of claim 1 wherein the processing circuitry is to:
store ANDSF information received from the H-ANDSF and V-ANDSF servers in an ANDSF MO (management object) that includes a leaf for an ANDSF server to indicate whether or not support exists for WLAN access using an S2a interface.

5. The device of claim 1 wherein the processing circuitry is to select service providers for NSWO (non-seamless WLAN offload) in accordance with information received from the H-ANDSF, when H-ANDSF policies are preferred, and the V-ANDSF, when V-ANDSF policies are preferred.

6. The device of claim 1 wherein the processing circuitry is to:
store ANDSF information received from the H-ANDSF server, when H-ANDSF policies are preferred in an ANDSF MO (management, object) that includes a leaf for the H-ANDSF server to indicate a preferred list of service providers to use for NSWO.

7. A user equipment (UE) device, comprising:
processing circuitry and a radio transceiver for both cellular and WLAN (wireless local area network) access, wherein the processing circuitry is to:
determine that network access has been acquired from a visited cellular operator and one or more WLANs (wireless local area network),
retrieve, in response to said determination, a setting that indicates a preference for NSWO (non-seamless WLAN offload) with no IP (internet protocol) address preservation when switching between cellular and WLAN access;
if the preference indicates that NSWO is to be performed, prefer policies for network selection and routing as indicated by ANDSF (access network and discovery selection function) information received from an H-ANDSF (home operator ANDSF) server over information received from a V-ANDSF (visited operator ANDSF) server;
if the preference indicates that NSWO is not to be performed, prefer policies for network selection and routing as indicated by the V-ANDSF server over those as indicated by the H-ANDSF server wherein the V-ANDSF server indicates that the visited cellular operator has support for WLAN access using an S2a interface.

8. The device of claim 7 wherein the processing circuitry is to prefer policies for network selection and routing as indicated by ANDSF information received from the H-ANDSF only if information received from the H-ANDSF indicates to do so when the preference indicates that NSWO is to be performed.

9. The device of claim 7 wherein the processing circuitry is to:
store ANDSF information received from the H-ANDSF server in an ANDSF MO (management object) that includes a leaf for the H-ANDSF server to indicate that its policies for network selection and routing should be preferred when the preference indicated that NSWO is to be performed.

10. The device of claim 7 wherein the processing circuitry is to:
store ANDSF information received from the H-ANDSF and V-ANDSF servers in an ANDSF MO (management object) that includes a leaf for an ANDSF server to indicate whether or not support exists for WLAN access using an S2a interface.

11. The device of claim 7 wherein the processing circuitry is to select service providers for NSWO in accordance with information received from the H-ANDSF, when H-ANDSF policies are preferred, and the V-ANDSF, when V-ANDSF policies are preferred.

12. The device of claim 7 wherein the processing circuitry is to:
store ANDSF information received from the H-ANDSF server in an ANDSF MO (management object) that includes a leaf for the H-ANDSF, when H-ANDSF policies are preferred, server to indicate a preferred list of service providers to use for NSWO (non-seamless WLAN offload).

13. A user equipment (UE) device, comprising:
processing circuitry and a radio transceiver for both cellular and WLAN (wireless local area network) access, wherein the processing circuitry is to:
determine that network access has been acquired from a visited cellular operator and one or more WLANs (wireless local area network),
retrieve, in response to said determination, ANDSF (access network and discovery selection function) information received from a V-ANDSF (visited operator ANDSF) server indicating whether or not the visited cellular operator supports SaMOG (S2a-based Mobility over GTP (general packet radio service tunneling protocol);
if the visited cellular operator does not support SaMOG, prefer policies for network selection and routing as indicated by ANDSF information received from an H-ANDSF (home operator ANDSF) server over information received from the V-ANDSF; and,
if the visited cellular operator does support SaMOG, prefer policies for network selection and routine as indicated by the V-ANDSF server over those as indicated by the H-ANDSF server wherein the V-ANDSF server indicates that the visited cellular operator has support for WLAN access using an S2a interface.

14. The device of claim 13 wherein the processing circuitry is to prefer policies for network selection and routing as indicated by ANDSF information received from the H-ANDSF only if information received from the H-ANDSF indicates to do so when the visited cellular operator does not support SaMOG.

15. The device of claim 13 wherein the processing circuitry is to:
storing ANDSF information received from the H-ANDSF server in an ANDSF MO (management object) that includes a leaf for the H-ANDSF server to indicate that its policies for network selection and routing should be preferred when the visited cellular operator does not support SaMOG.

16. The device of claim 13 wherein the processing circuitry is to:
store ANDSF information received from the H-ANDSF and V-ANDSF servers in an ANDSF MO (management object) that includes a leaf for an ANDSF server to indicate whether or not support exists for WLAN access using an S2a interface.

17. The device of claim 13 wherein the processing circuitry is to select service providers for NSWO (non-seamless WLAN offload) in accordance with information received from the H-ANDSF, when H-ANDSF policies are preferred, and the V-ANDSF, when V-ANDSF policies are preferred.

18. The device of claim 13 wherein the processing circuitry is to:
store ANDSF information received from the H-ANDSF server in an ANDSF MO (management object) that includes a leaf for the H-ANDSF server, when H-ANDSF policies are preferred, to indicate a preferred list of service providers to use for NSWO.

* * * * *